Aug. 25, 1953    M. R. WESTOVER    2,649,884
ATTACHMENT NUT
Filed June 17, 1948

INVENTOR:
MILES R. WESTOVER,
BY Rogers + Ezell
ATTORNEYS.

Patented Aug. 25, 1953

2,649,884

UNITED STATES PATENT OFFICE 2,649,884

ATTACHMENT NUT

Miles R. Westover, Alton, Ill.

Application June 17, 1948, Serial No. 33,602

5 Claims. (Cl. 151—41.75)

1

The present invention relates to an attachment nut or bolt combination.

It is an object of the invention to provide an attachment nut that can be readily applied to work from the same side of the work that the bolt is applied from; and more especially to improve upon devices of this character such as those shown in Carr Patent No. 1,755,590, Bugg Patent No. 2,379,786, and the like.

A particular object of the invention is to provide such a nut and bolt combination that can receive wrenches on the same side of the work for both the nut and the bolt for secure tightening the same. An added object is to provide a nut of this type that requires no special preparation of the work, other than drilling of holes.

Another object of the invention is to provide a nut device of this kind that is easy to apply to the work and easy to operate to attach parts together, but which provides a very secure attachment. It is also an object to provide such a nut that has only two parts, readily made, and which may be supplied in an assembled relation as one device that will not come apart except when manually separated, and which, when assembled, appears like a conventional nut to receive a conventional wrench.

Other objects will appear from the description to follow.

Figure 1:
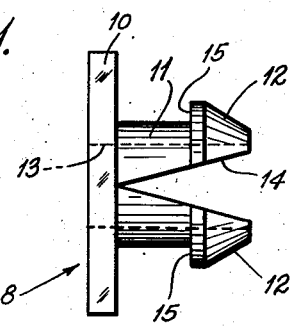
Fig. 1 is an edge elevation of the mounting nut grip element.
Figure 2:
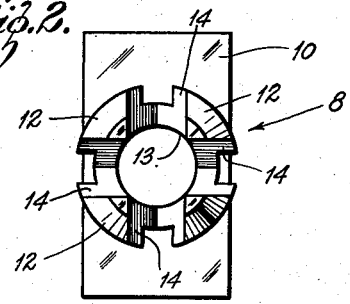
Fig. 2 is a side elevation of the mounting nut grip element taken from the right of Fig. 1.
Figure 3:
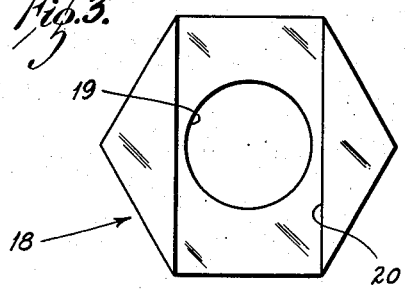
Fig. 3 is a side view of the mounting nut base.
Figure 4:
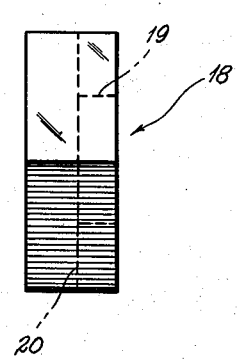
Fig. 4 is an edge view of the mounting nut base of Fig. 3.
Figure 5:
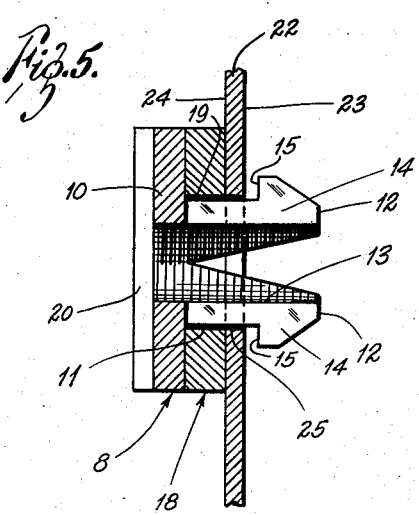
Fig. 5 is a sectional view showing the mounting nut grip and base assembly installed in a workpiece.
Figure 6:
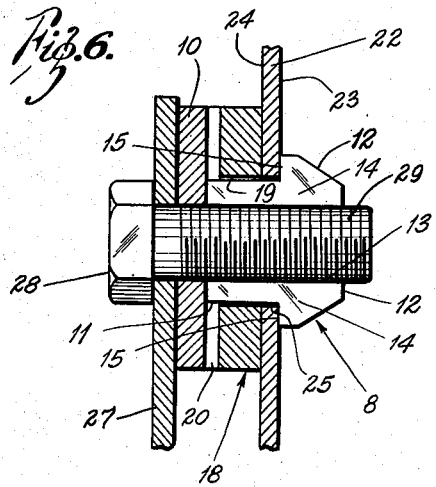
Fig. 6 is a view of the mounting nut grip and base installed in a workpiece with a screw therein binding the parts together.

The grip element 8 of the present nut member includes a flange 10, from which there extends a notched sleeve-like portion 11 that is preferably generally cylindrical in shape. It has a head portion 12 at its outer end. A threaded opening 13 passes axially through the mounting nut grip. A plurality of notches 14, preferably of V-shape, extend through the head 12 and the sleeve-like portion 11 for a distance sufficient to render the prongs compressible radially inwardly.

The mounting nut grip flange 10 is preferably rectangular or of some shape that may be held

2 against axial rotation, as will appear. The sleeve portion 11 has its axis at right angles to the flange 10, in the preferred construction. The head 12 has its outer surface portions formed as sections of a conical frustrum coaxial with the cylindrical section 11, from which the V-notches 14 have been removed. It will, of course, be understood that the foregoing analysis of the geometry of the elements is not a limitation on the method of manufacture. The head 12 terminates at its base preferably in sharp right-angular shoulder portions 15. The material is of such character and the notches of such shape that the head portion 12 may be forced through a hole of approximately the diameter of the outside of the sleeve portion 11, the prongs compressing or yielding radially inwardly to permit the enlarged base of the head portion 12 to pass through the hole.

The mounting nut base is generally indicated at 18, and preferably comprises a hexagon, although other shapes may be used. The base has a thickness outwardly from the surface that abuts the work, that provides a wrench-receiving edge. The purpose of the hexagonal shape is to afford means for engagement of the member 18 by a conventional wrench, and to enable the nut base to be fabricated from available stock. Of course, other shapes may be used at the cost of these advantages.

The mounting base 18 has a hole 19 therethrough that is of a size to receive the sleeve portion 11 of the mounting nut grip 8. The base 18 also has a groove or channel 20 that is of a size to receive the flange 10 of the mounting nut grip and to hold the same against rotation. The rectangular shapes of the flange 10 and the groove 20 are desirable for simplicity of manufacture, but it will be understood that other shapes may be used to retain the members 8 and 18 against relative rotation. The channel shape illustrated is particularly adaptable to conventional hexagonal or rectangular stock.

The use of the device is as follows:

A sheet or plate 22 is shown to represent a workpiece to which another element is to be attached. It may be a sheet such as an instrument panel having a back side 23 and a front side 24, with the back side inaccessible to a holding wrench.

A hole 25 is formed in the plate 22 of a size slightly greater than the external diameter of the sleeve portion 11, but less than the external diameter of the base of the conical head 12.

The mounting nut grip is then interengaged with the mounting nut base 18 by pressing the tapered prongs 12 through the hole 19. These prongs yield radially inwardly when pressed axially into the hole 19, but, when the tapered portion 12 has passed through the base 18, the prongs will snap outwardly again so that the parts are held together. The grip element 8 is displaced into the nut 18 until the flange 10 fits into the channel or recess 20, to hold the parts against rotation, and to project the head 12 and the sleeve-like portion 11 for passage through the plate 22. Thereafter, the combination of these two parts 8 and 18 is applied to the plate 22, and the prongs 12 of the mounting nut grip 8 are forced through the hole 25, with the prongs 12 yielding as before and snapping out to present the squared shoulders 15 to the remote side 23 of the plate 22.

Thereafter, the plate 27, that represents the part to be attached to the plate 22, is brought to position and a headed screw 28, threaded to engage in the bore 13, is passed through the plate 27 and into the bore 13 of the mounting nut grip 8. This screw 28 has its threaded shank 29 of a size to fit within the bore 13 when the prongs 12 are extended. Hence it will insure that the prongs 12 are forced outwardly and that they cannot yield radially inwardly. Their outward expansion is limited by the nut base 18 and the plate 22. The screw 28 is tightened into the mounting nut grip 8. The plate 27 to be attached engages with the surfaces of the mounting nut base 18 beyond the groove 20, so that there is a solid connection from the plate 27 through the mounting nut base 18 to the plate 22. However, owing to the fact that the flange 10 of the mounting nut grip is thinner than the depth of the groove 20 of the mounting nut base 18, the mounting nut grip is subject to axial movement between the bottom of the groove 20 and the top of that groove now defined by the surface of the plate 27.

When the screw 28 is tightened up, it draws the mounting nut grip toward the head of the screw, thereby bringing the shoulders 15 back against the remote surface 23 of the plate 20, and causing these shoulders 15 to bind tightly against that surface to hold the parts securely together. The tightness is enhanced by having the shoulders 15 at right angles to the axis of the nut device. Of course, in order to obtain a very tight fit, the sleeve portion 11 must be of such a length that the flange 10 of the mounting nut grip reaches the upper limits of the groove 20, or the inner surface of the plate 27, only after a tight binding of the shoulders 15 against the plate 20.

In this tightening operation, a wrench may be inserted around the mounting nut base 18 on the accessible side 24 of the plate 22. Likewise, a wrench may be applied to the screw 28 from the same side of the plate 20.

By this nut, a tight attachment of parts can be made wholly from one side of the part to which they are to be attached. Of course, where spacing between the member 27 to be attached and the plate 22 to receive the attachment is not desired, the hole through the member 27 may be large enough to receive the sleeve portion 11 of the mounting nut grip 8, and that portion may be made long enough to receive the plate 27 for disposition in abutting relationship with the plate 20. Then the head of the screw 28, or a washer used with it, must merely be large enough to engage onto the nut beyond the groove 20.

It will be seen that this nut arrangement provides for attaching parts together securely from one side of one of the parts. It requires no special preparation of the parts to be attached other than the very familiar drilling of holes therethrough. It can be operated with ordinary wrenches when it is made with a preferred construction, such as that illustrated. It requires only one part more than an ordinary bolt. It requires no deformation of parts in order to secure a tight fit. It provides squared shoulders that are firmly engaged against the inner surface of the main workpiece, and which have a compressive action the same as that of an ordinary nut of a bolt, and it can be constructed out of conventional stock by familiar screw machines, or it may be made by other processes such as die operations.

What is claimed is:

1. A device of the type described including a nut base containing an opening therethrough and having a wrench-receiving portion, said nut base also having a surface substantially normal to the axis of the hole for abutment against work, and a recess on its side opposite said surface; and a grip element for engagement with the nut base having a sleeve-like portion and a flange projecting laterally therefrom, the sleeve-like portion having an enlarged head at its end opposite from the flange, a threaded opening extending through the flange and into the sleeve-like portion, the head of the sleeve-like portion having shoulders extending substantially normally to the axis of the opening and spaced axially from the flange, and the sleeve-like portion having longitudinal cutouts to divide it into radially compressible prongs; the opening through the base being adapted to receive the sleeve-like portion of the grip element therethrough whereby the flange is interengaged non-rotatably with the recess in the base, and the head of the sleeve-like portion is spaced from the work abutting surface of the base; the recess in the nut base having an axial depth greater than the thickness of the flange of the grip element.

2. A device of the type described including a nut base containing an opening therethrough and having a wrench-receiving portion, said nut base also having a surface substantially normal to the axis of the hole for abutment against work, and a recess on its side opposite said surface; and a grip element for engagement with the nut base having a sleeve-like portion and a flange projecting laterally therefrom, the sleeve-like portion having an enlarged head at its end opposite from the flange, a threaded opening extending through the flange and into the sleeve-like portion, the head of the sleeve-like portion having shoulders extending substantially normally to the axis of the opening and spaced axially from the flange, and the sleeve-like portion having longitudinal cutouts to divide it into radially compressible prongs; the opening through the base being adapted to receive the sleeve-like portion of the grip element therethrough whereby the flange is interengaged non-rotatably with the recess in the base, and the head of the sleeve-like portion is spaced from the work abutting surface of the base; the recess in the nut base having an axial depth greater than the thickness of the flange of the grip element and comprising a channel extending diametrically across the nut base.

3. A device of the type described including a plate-like nut base containing an opening therethrough, one side surface of the base being shaped to abut the work and the other side providing peripheral edges back of said surface shaped to receive a wrench, a recess in the side of the nut base opposite the work abutment side; and a grip element for engagement with the nut base and having a sleeve-like portion and a flange projecting laterally therefrom, said nut base being removable from said grip element, the sleeve-like portion having an enlarged head at its end opposite from the flange, and a threaded opening extending through the flange and into the sleeve-like portion, the head of the sleeve-like portion having shoulders extending substantially normally to the axis of the opening and spaced axially from the flange, the sleeve-like portion having longitudinal cutouts to divide it into radially compressible prongs; the opening through the base being adapted to receive the sleeve-like portion of the grip element therethrough whereby the flange is engaged non-rotatably with the recess in the base and the head of the sleeve-like portion is spaced from the work abutting surface of the base.

4 A device of the type described including a nut base containing an opening therethrough and having a wrench-receiving portion, said nut base also having a surface substantially normal to the axis of the hole for abutment against work, and a recess on its side opposite said surface; and a grip element for engagement with the nut base having a sleeve-like portion and a flange projecting laterally therefrom, the sleeve-like portion having an enlarged head at its end opposite from the flange, a threaded opening extending through the flange and into the sleeve-like portion, the head of the sleeve-like portion having shoulders extending substantially normally to the axis of the opening and spaced axially from the flange, and the sleeve-like portion having longitudinal cutouts to divide it into radially compressible prongs; the opening through the base being adapted to receive the sleeve-like portion of the grip element therethrough whereby the flange is interengaged non-rotatably with the recess in the base, and the head of the sleeve-like portion is spaced from the work abutting surface of the base; the recess in the nut base having an axial depth greater than the thickness of the flange of the grip element, and the head of the sleeve-like portion having sloping surfaces on the side opposite the flanges, so that when forced through a hole, the prongs will be compressed.

5. A device of the type described including a nut base containing an opening therethrough and having a wrench-receiving portion, said nut base also having a surface substantially normal to the axis of the hole for abutment against work, and a recess on its side opposite said surface; a grip element for engagement with the nut base having a sleeve-like portion and a flange projecting laterally therefrom, the sleeve-like portion having an enlarged head at its end opposite from the flange, a threaded opening extending through the flange and into the sleeve-like portion, the head of the sleeve-like portion having shoulders extending substantially normally to the axis of the opening and spaced axially from the flange, and the sleeve-like portion having longitudinal cutouts to divide it into radially compressible prongs; the opening through the base being adapted to receive the sleeve-like portion of the grip element therethrough whereby the flange is interengaged non-rotatably with the recess in the base, and the head of the sleeve-like portion is spaced from the work abutting surface of the base; the recess in the nut base having an axial depth greater than the thickness of the flange of the grip element; and a screw shaped to fit into the opening of the grip element from the flanged end thereof to engage the nut base beyond the recess, whereby the screw draws the head of the sleeve-like portion toward the base, the screw having a length to enter the sleeve-like portion and prevent compression inwardly of the prongs.

MILES R. WESTOVER.

References Cited in the file of this patent

UNITED STATES PATENTS

| Number | Name | Date |
| --- | --- | --- |
| 1,414,979 | Carter | May 2, 1922 |
| 1,512,896 | Kraft | Oct. 21, 1924 |
| 1,646,366 | Carr | Oct. 18, 1927 |
| 1,755,590 | Carr | Apr. 22, 1930 |
| 1,816,970 | Hess | Aug. 4, 1931 |
| 1,978,935 | Douglas | Oct. 30, 1934 |
| 2,279,903 | Johnson | Apr. 14, 1942 |
| 2,386,922 | Andrews | Oct. 16, 1945 |
| 2,393,606 | Brush | Jan. 29, 1946 |